Sept. 30, 1930.                L. K. MURRAY                1,777,103
              VARIABLE SPEED TRANSMISSION GEARING
                       Filed July 13, 1928
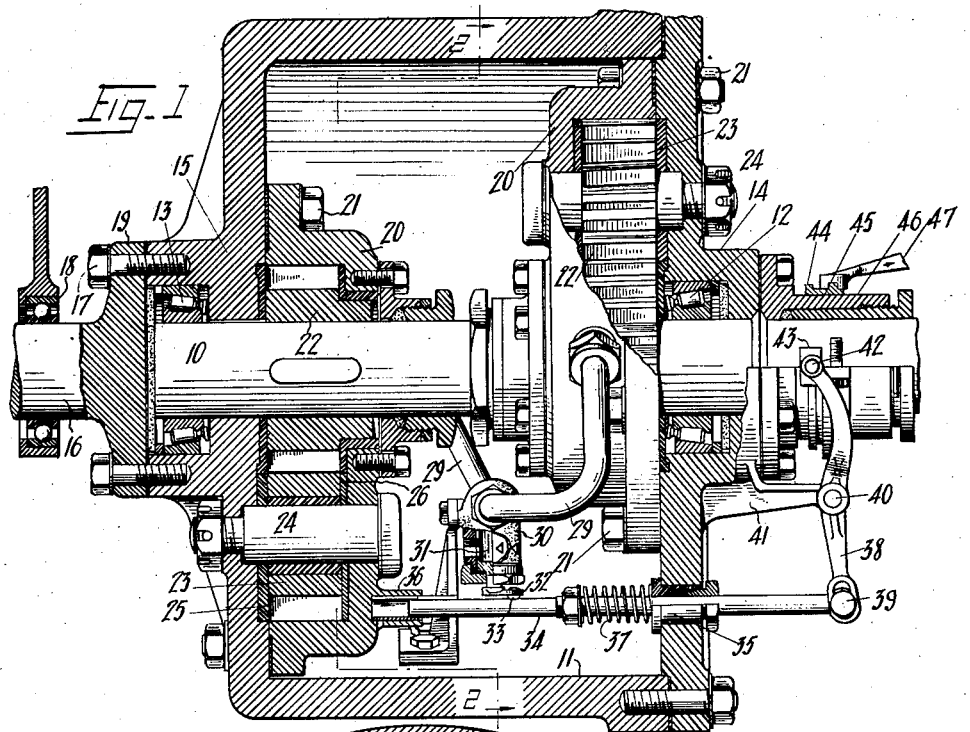
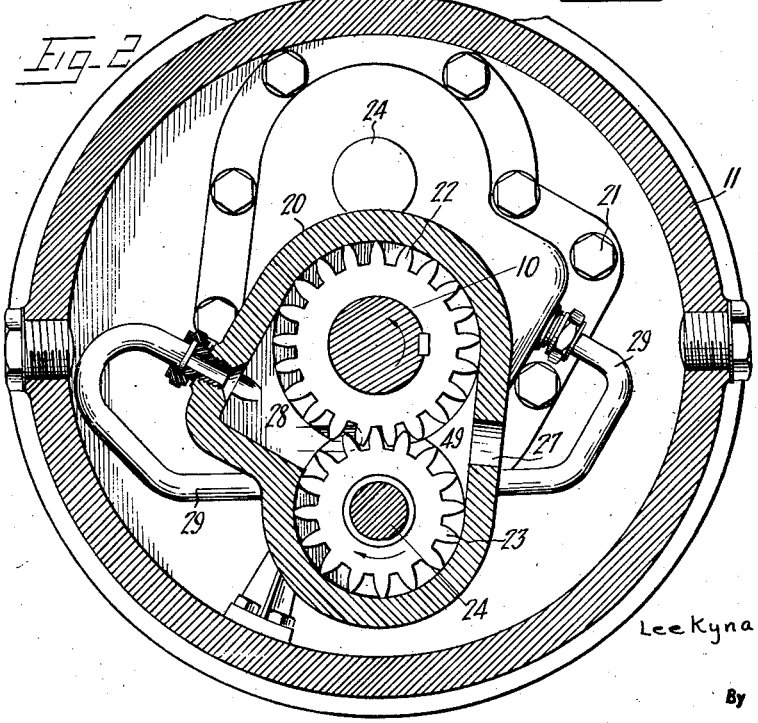
Lee Kynaston Murray
INVENTOR:
By
his Attorney.

Patented Sept. 30, 1930

1,777,103

UNITED STATES PATENT OFFICE

LEE KYNASTON MURRAY, OF SYDNEY, NEW SOUTH WALES, AUSTRALIA

VARIABLE-SPEED-TRANSMISSION GEARING

Application filed July 13, 1928, Serial No. 292,344, and in Australia August 1, 1927.

This invention relates to motion transmission gearing for varying the speed-torque ratio between a driving shaft and a driven shaft. It has its chief utility in automobile vehicles, but is adaptable for use generally wherever it is required to vary the speed ratio between a driving shaft and a driven shaft.

In the gearing in which the present invention consists, the driven shaft is fixed to a drum and the driving shaft extends axially through this drum, and carries it. The coupling between the driving shaft and the drum is a "slipping" coupling of the hydraulic circulating pump type. The invention resides in the structural features of this coupling and comprises the provision of two spur gear oil pumps, the casings of which are fixed to opposite ends of a closed drum and disposed diametrically opposite to each other to procure static balance of the drum, said pumps operating in unison but independently of each other, their deliveries being controlled by a single valve which is located within the drum but external to the pumps, and which is adjustable manually to vary the rate of flow of oil. When the valve is shut off, passage of oil out of the delivery chambers of the pump casings is checked, and rotation of the gear wheels being thus checked, the system becomes "locked", and the drum and driven shaft are in effect thus directly coupled to the driving shaft. This is the "direct drive" position. When the valve is opened more or less, oil may pass out of the pump delivery chambers, with the result that the meshed gear wheels which function as a pump are permitted to rotate, "slip", represented by the rate at which the oil is permitted to circulate, taking place, so that the driven shaft is rotated, but at a slower rate than the driving shaft. When the valve is fully opened, the reaction component is lost and there is total slip and the drum is then no longer rotated though the driving shaft is maintained in rotation.

In the accompanying drawing:—

Fig. 1 is a longitudinal sectional elevation of a coupling according to the invention, appropriately designed for installation as transmission equipment for an automobile; and Fig. 2 is a transverse section in the plane 2—2 Fig. 1.

The primary or driving shaft 10 is direct connected to the engine through the driven element of the clutch (not shown), and it carries the closed drum 11 rotatably on it, 12 and 13 being taper roller bearings in the drum heads 14 and 15. A flange 19 on the forward end of the driven shaft (propeller shaft) 16 is fixed to the back head 15 of the drum 11 by studs 17 or otherwise, and a bearing, indicated at 18, is provided to carry that end of the driven shaft and through it to support the overhanging weight of the drum and the overhanging weight of the driving shaft extension within the drum.

Two oil pumps are fitted within the drum, with their casings respectively fixed to the two covers of the drum. Only one pump is essential, but it is highly advantageous to fit two pumps as shown and to control both of them simultaneously by one valve.

Each pump casing 20 consists of a chamber, one side of which is open and flanged. The open side is fitted up to a head of the drum and is secured thereto by bolts 21. The casing is very accurately machined on the interior back face of it and also at opposite ends of it to make sliding contact with the teeth tips and the sides of a pair of intermeshed spur wheels 22 and 23. The contact at the teeth tips extends over a semi-circular arc for each of the wheels. The spur wheel 22 is keyed on the driving shaft 10 and the spur wheel 23 is freely rotatable on an axle 24 which is carried by the housing. The sides of the wheels 22 and 23 are neat fits on the flat back wall of the casing 20 and the interior face of the drum head respectively. 25 and 26 are shim plates which are inset in the casing wall and in the drum head respectively to obtain accurate fitting which will substantially prevent leakage of oil backward over the sides of the wheels 22 and 23. Stuffing boxes are fitted to prevent leakage of oil along the shaft 10. 27 is an oil intake port in one wall of the casing, entering the pump intake chamber 49 opposite the intermeshing teeth of the wheels 22 and 23, and 28 is the delivery chamber of the pump.

29 is a pipe led from the delivery chamber 28 to the control valve casing 30. 31 is a slotted plug which is adjustable in the valve casing 30 to control the rate of circulation of oil. A crank arm 32 fixed to the spindle of this plug is connected by a link to a thrust pin 33 which is fixed in the top side of the control rod 34. That rod is movable longitudinally in the drum; it passes into it through a stuffing box 35 fitted in one head of the drum, and its inner end is supported in a slide bearing 36. A spring 37 may be fitted to force the rod 34 in one direction, thus to set the valve at either full closed position or at full open position as may be desirable. In automobile equipment the spring should be arranged to move the valve to the fully closed position. The outer end of the rod 34 is connected to a fork lever 38 by a pin and slot joint 39. The lever fulcrum 40 is carried on a bracket 41 which is cast on or fixed to the fore end head of the drum, and its fork ends carry pivot pins 42 on runners 43 which are grooved to run over the flange 44 on the sleeve 45, which is slidable endwise on the shell of the stuffing box 46 through which the driving shaft 10 passes into the drum. The sleeve 45 is slidable by means of a manually operatable arm 47.

By fitting two pumps, one at either end of the drum, with their weights oppositely disposed in relation to the drum axis, static balancing of the drum is facilitated; counterweights to procure dynamic balancing should also be fitted; this is an important point when the coupling is required to be operated at high speed, as then the effect of centrifugal force is considerable. The control of the two pumps though one valve is also advantageous as it procures equalization of the torque.

The operation of the coupling is as follows:—

Let it be assumed that the sleeve 45 is moved by means of the arm 47 to the full-out position at which the rod 34 is drawn outward and the valve plug 31 is rotated to the full open position. The drum is charged with oil to about centre level. The shaft 10 being now rotated, the spur wheel 22 turning with it, the spur wheel 23 which is in mesh with the wheel 22 also rotates. The direction of rotation is shown by arrows. Oil passes into the casing 20 through the port 27, and filling the tooth spaces of the spur wheels as they sweep through the intake chamber 49, is carried round in the tooth spaces to the delivery chamber 28. As the valve 31 is open and as the oil thus carried into the delivery chamber 28 cannot return between the intermeshing spur gears, it passes out of the delivery chamber through the pipe 29 and is returned through the valve to the oil charge which is contained in the body of the drum. As only small resistance is offered to this circulation of oil, the torque applied to the drum is also small and is not sufficient to rotate it against a load. When the control 47 is moved to partially close the valve 31, the oil circulation is throttled more or less, and resistance is imposed against the rotation of the spur wheels. This resistance produces a reaction component which operates to rotate the drum 11 at a rate lower than the rate of rotation of the shaft 10, the difference between the respective rates of rotation of the drum and the shaft corresponding with the degree of opening of the valve 31 and the consequent rate of oil circulation. When the control is moved to fully close the valve 31, the oil circulation is arrested, and the drum is then in effect locked to the shaft 10 by the oil under compression in the delivery chamber 28, and the shaft 16 then turns at the same speed as the shaft 10. The coupling is therefore immediately variable to procure any drive-driven ratio between nil and unity by adjustment of the valve. Accidental back leakage of oil between the spur gears and the gear casing will be practically negligible when the fitting is satisfactorily neat, and whatever leak does occur will pass back to the charge in the drum and will not be lost. The drum radiates the heat which is generated by oil friction in the operation of the coupling. For automobile transmissions it is necessary to provide reversing gearing of epicyclic or other known type in connection with the driven shafts.

The coupling is reversible, that is to say, the primary drive might be applied to the drum, in which case the shaft 10 would become the driven shaft.

What I claim as my invention and desire to secure by Letters Patent is:—

1. A variable speed transmission gearing including a driven shaft, a closed drum constituting an oil reservoir fixed to said shaft, bearings in the ends of said drum, a co-axial driving shaft extending into said drum and working in said bearings, two separate casings fixed to said drum, two independently operating spur gear oil pumps mounted respectively within said casings, a control valve, a port directly connecting the inlet chamber of each pump with the oil reservoir, means for directly connecting the delivery chamber of each pump with said control valve, and means for operating said valve to control the flow of oil.

2. A variable speed transmission gearing according to claim 1, in which the oil pump casings are fixed respectively to opposite ends of the oil reservoir and disposed diametrically opposite to each other to procure static balance.

3. A variable speed transmission gearing according to claim 1, having stuffing boxes fitted on the driving shaft to prevent leakage of oil.

4. In a variable speed transmission gearing according to claim 1, pipe connections from the delivery chamber of each pump to the control valve, a stuffing box on one side of the drum, a sliding rod extending through said stuffing box, an operating connection between said rod and said valve, a sleeve slidably mounted on the driving shaft, means for sliding said sleeve, and connecting means between said rod and said sleeve for operating said valve.

5. In a variable speed transmission gearing according to claim 1, a sliding rod extending through one end of the drum, an operating connection between said rod and the control valve, a spring for maintaining said rod and said valve in a predetermined position, and means for sliding said rod to operate said valve.

6. In a variable speed transmission gearing according to claim 1, a sliding rod extending through one end of the drum, an operating connection between said rod and the control valve, a spring for maintaining said rod and said valve in a predetermined position, a sliding sleeve co-axially mounted in relation to the drum, means for sliding said sleeve endwise, a collar on said sleeve, grooved runners adapted to run on said collar, a bracket fixed to the drum, and a forked lever fulcrumed on said bracket, said lever being articulated at its forked end to said runners and at its other end to said rod to apply endwise movement to the rod to operate the control valve.

In testimony whereof I affix my signature.

LEE KYNASTON MURRAY.